United States Patent
Roche et al.

(10) Patent No.: US 10,344,877 B2
(45) Date of Patent: Jul. 9, 2019

(54) MULTI-PORT VALVE WITH MULTIPLE OPERATION MODES

(71) Applicant: Tesla Motors, Inc., Palo Alto, CA (US)

(72) Inventors: Nicholas Albert Roche, San Francisco, CA (US); Joseph Stratford Maxwell Mardall, San Francisco, CA (US); Jan Kopitz, Fremont, CA (US); Curt Raymond O'Donnell, Erie, PA (US)

(73) Assignee: Tesla Motors, Inc., Palo Alto, CA (US)

( * ) Notice: Subject to any disclaimer, the term of this patent is extended or adjusted under 35 U.S.C. 154(b) by 0 days.

(21) Appl. No.: 15/365,781

(22) Filed: Nov. 30, 2016

(65) Prior Publication Data
US 2017/0152957 A1    Jun. 1, 2017

Related U.S. Application Data

(60) Provisional application No. 62/261,804, filed on Dec. 1, 2015.

(51) Int. Cl.
*F16K 11/085* (2006.01)
*B01D 24/46* (2006.01)

(52) U.S. Cl.
CPC ........ *F16K 11/085* (2013.01); *F16K 11/0853* (2013.01); *F16K 11/0856* (2013.01); *B01D 24/4642* (2013.01); *Y10T 137/86654* (2015.04); *Y10T 137/86726* (2015.04)

(58) Field of Classification Search
CPC ............... F16K 11/085; F16K 11/0853; F16K 11/0856; B01D 24/4642; Y10T 137/86726; Y10T 137/86654
See application file for complete search history.

(56) References Cited

U.S. PATENT DOCUMENTS

| 1,422,178 | A |   | 7/1922  | Cooley |
|-----------|---|---|---------|--------|
| 3,251,408 | A |   | 5/1966  | Watson |
| 3,927,693 | A | * | 12/1975 | Johnston ................. F16K 11/00 137/625.47 |
| 4,429,717 | A | * | 2/1984  | Montgomery ..... B65G 65/4881 137/242 |
| 5,431,189 | A | * | 7/1995  | Jones ................. B60H 1/00585 137/625.42 |

(Continued)

FOREIGN PATENT DOCUMENTS

| GB | 270997 A   | 5/1927  |
|----|------------|---------|
| JP | 47008560 A | 10/1972 |

(Continued)

OTHER PUBLICATIONS

International Searching Authority; International Search Report and Written Opinion; International Application No. PCT/US2016/064340; dated Feb. 16, 2017; 9 pgs.

*Primary Examiner* — Michael R Reid
*Assistant Examiner* — Christopher D Ballman
(74) *Attorney, Agent, or Firm* — Garlick & Markison; Bruce E. Garlick; Harry S. Tyson, Jr.

(57) ABSTRACT

A multi-port, multi-mode valve includes: a valve housing; multiple ports on the valve housing, a spacing between first and second ports being smaller than a spacing between third and fourth ports; and a stemshell positioned at least partly inside the valve housing, the stemshell having at least two channels configured for selectively coupling one or more of the ports to a selected at least other one of the ports.

18 Claims, 21 Drawing Sheets

(56) References Cited

U.S. PATENT DOCUMENTS

| | | | |
|---|---|---|---|
| 5,529,758 A * | 6/1996 | Houston | F16K 11/0853 137/312 |
| 5,871,032 A * | 2/1999 | Ko | F16K 11/085 137/597 |
| 6,245,233 B1 | 6/2001 | Lu | |
| 9,618,128 B2 * | 4/2017 | Dourdeville | G01N 30/20 |
| 2004/0221901 A1 * | 11/2004 | Chen | F16K 11/0853 137/625.23 |
| 2006/0118066 A1 * | 6/2006 | Martins | F01P 7/165 123/41.08 |
| 2006/0237359 A1 | 10/2006 | Lin et al. | |
| 2008/0223464 A1 | 9/2008 | Merrell | |
| 2010/0319796 A1 | 12/2010 | Whitaker | |
| 2014/0053931 A1 * | 2/2014 | Whitaker | F16K 11/0853 137/625.17 |
| 2014/0090414 A1 | 4/2014 | McLane et al. | |
| 2015/0354716 A1 * | 12/2015 | Morein | F16K 11/0853 137/625.47 |

FOREIGN PATENT DOCUMENTS

| | | |
|---|---|---|
| JP | 5530545 A | 3/1980 |
| JP | 199422672 U | 3/1994 |

* cited by examiner

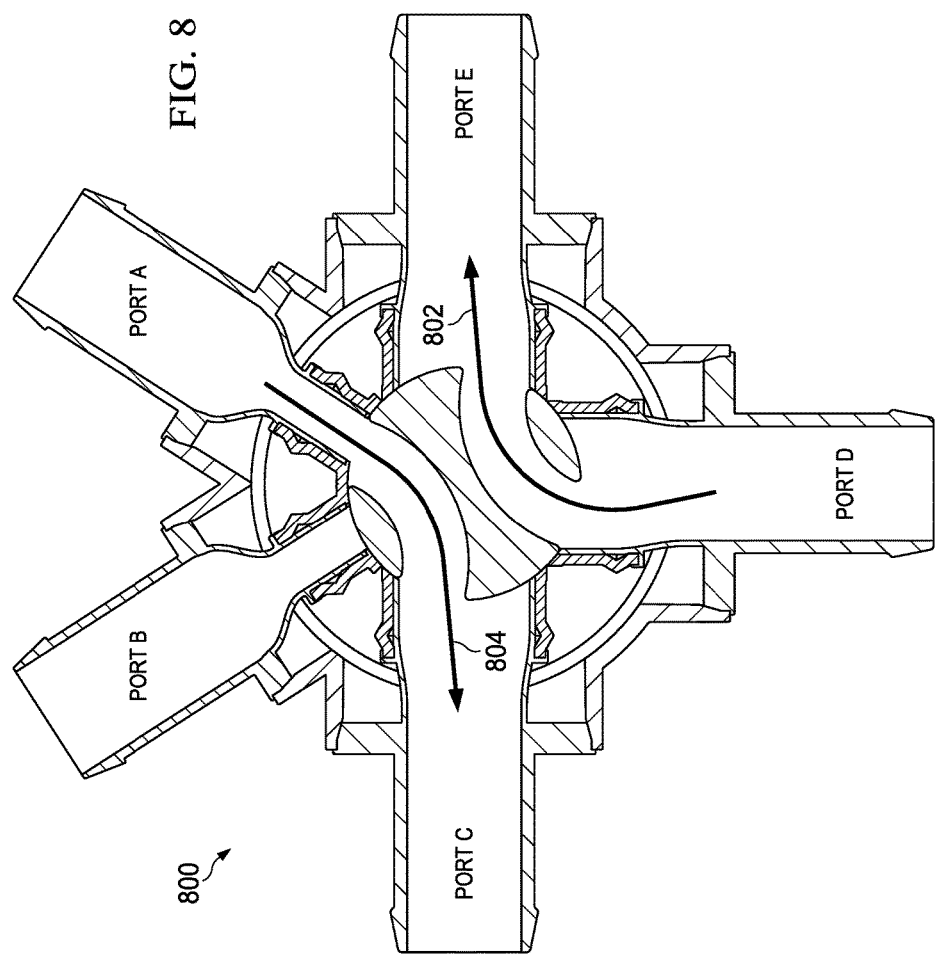

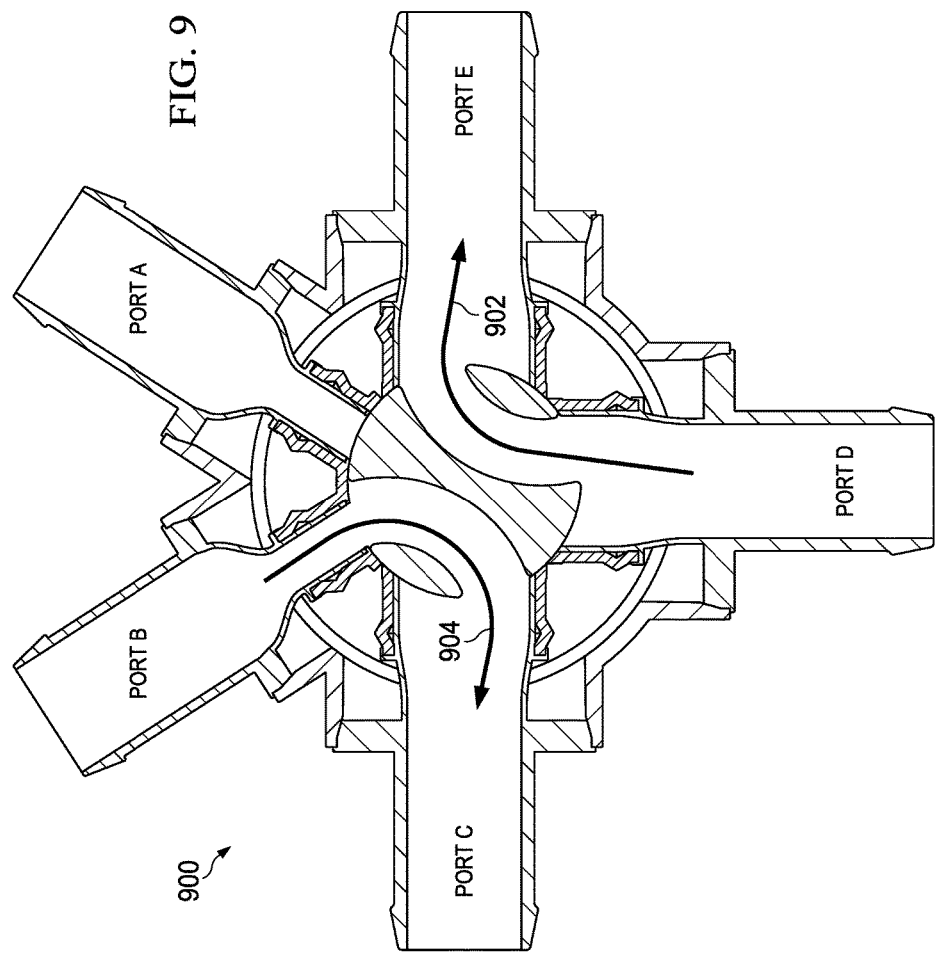

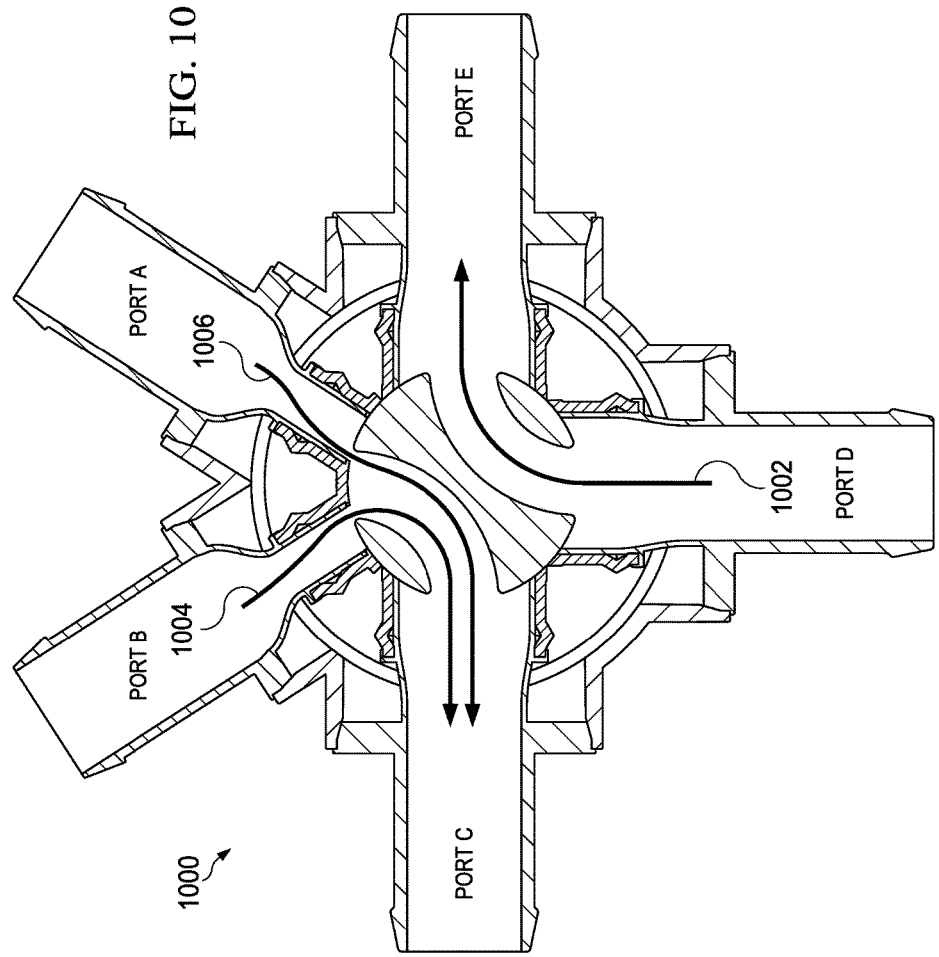

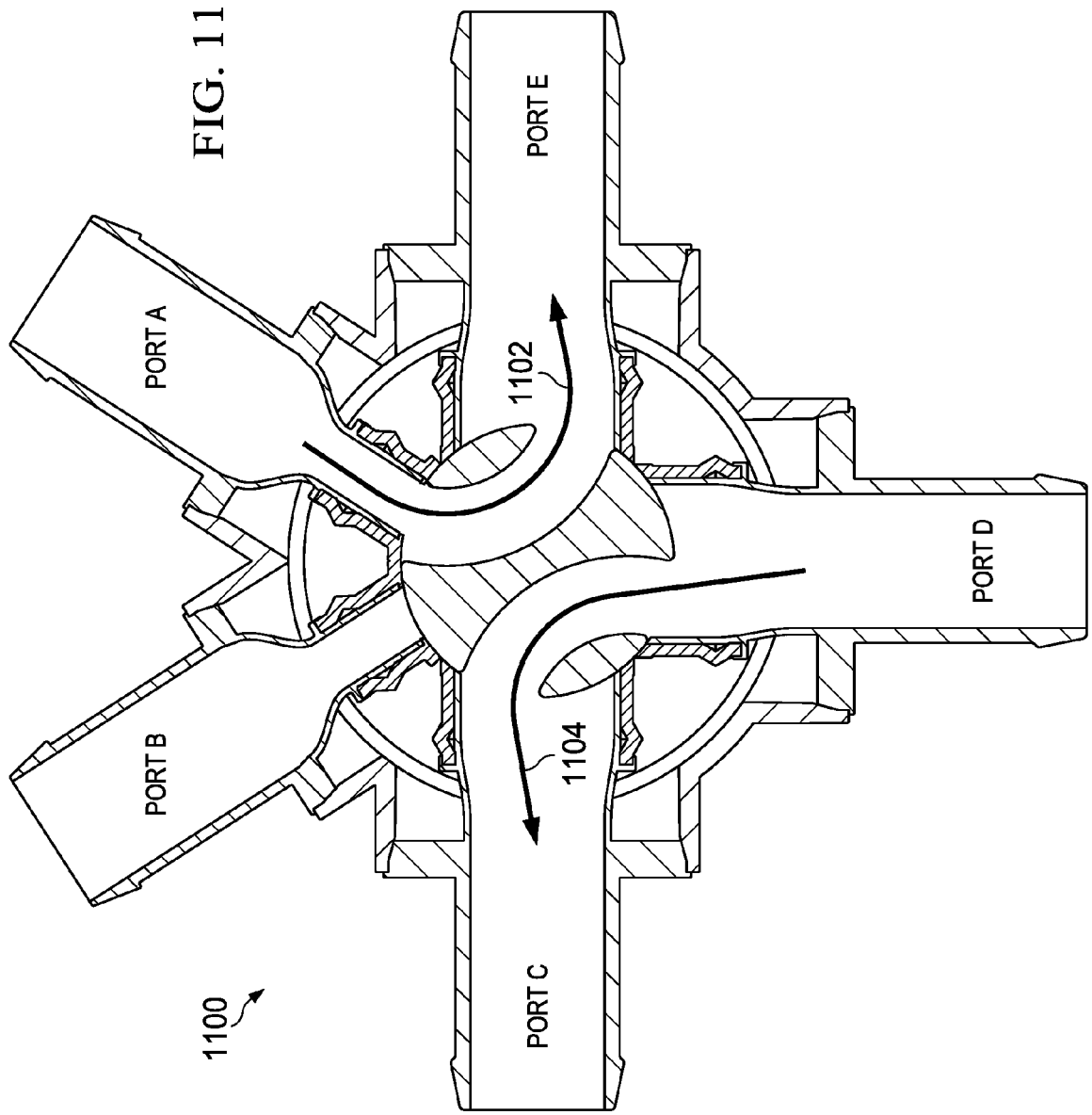

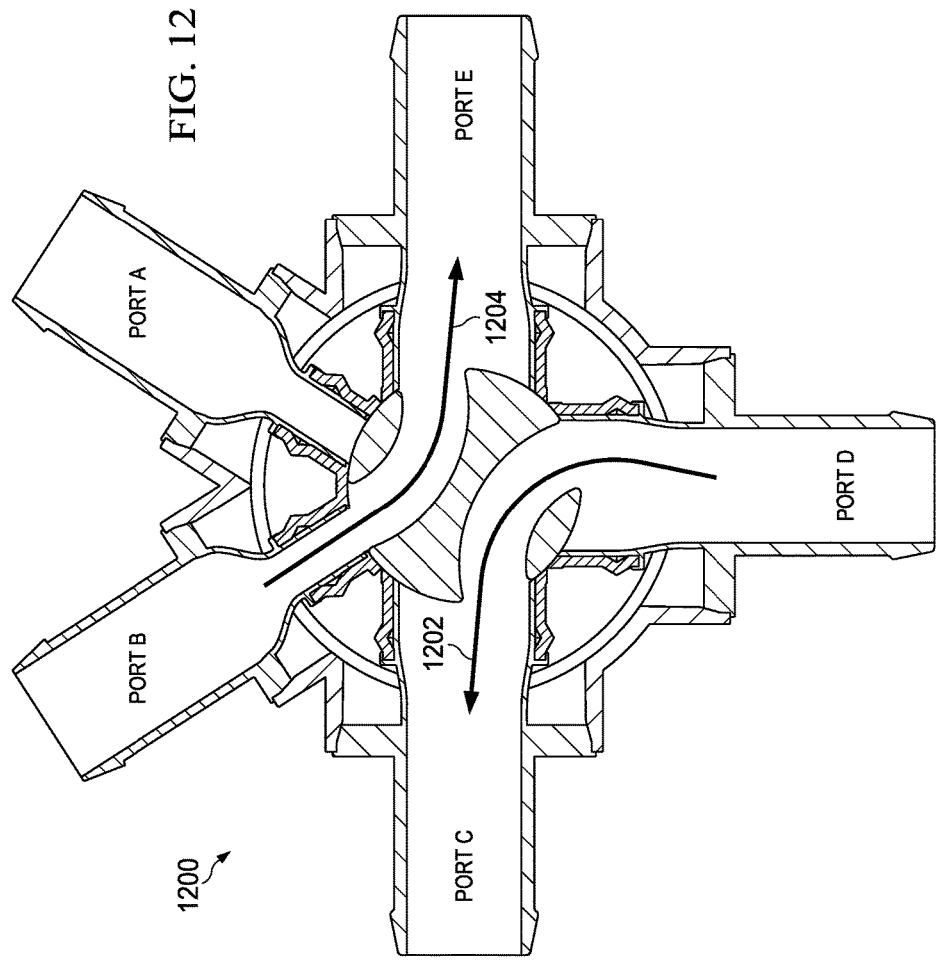

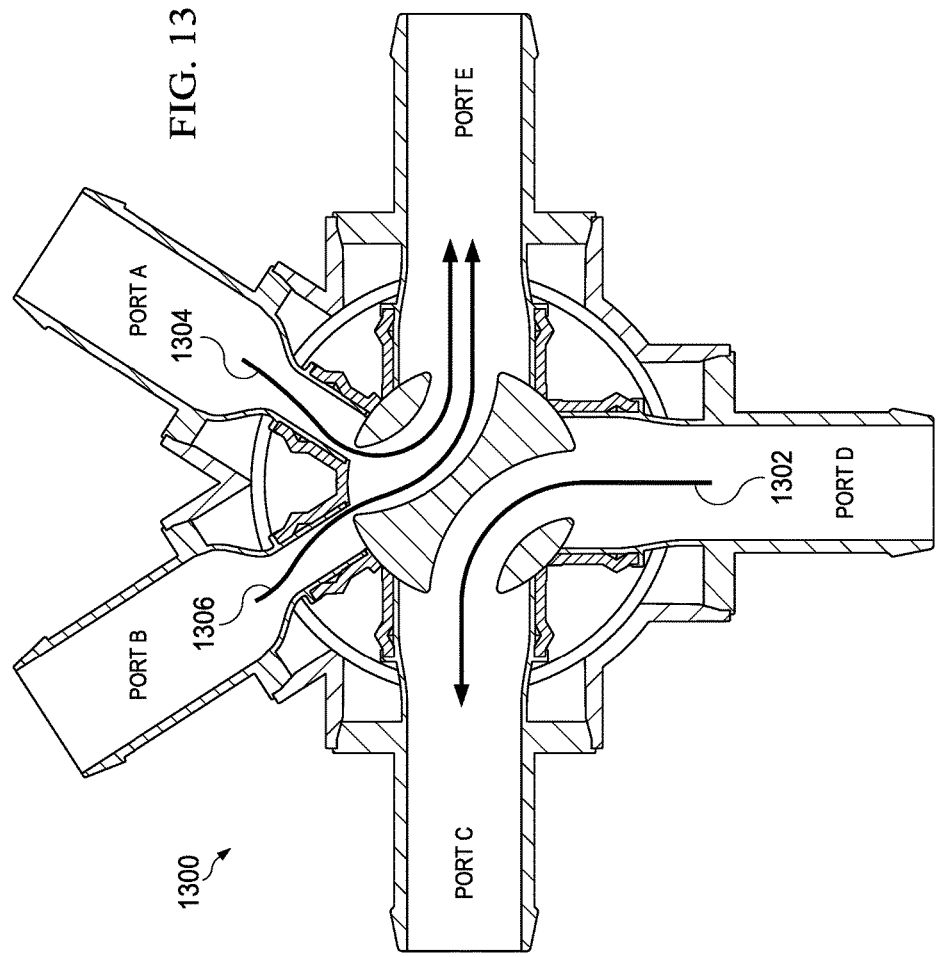

MULTI-PORT VALVE WITH MULTIPLE OPERATION MODES

CROSS REFERENCE TO RELATED PATENTS

The present U.S. Utility Patent Application claims priority pursuant to 35 U.S.C. § 119(e) to U.S. Provisional Application No. 62/261,804, entitled "MULTI-PORT VALVE WITH MULTIPLE OPERATION MODES", filed Dec. 1, 2015, which is hereby incorporated herein by reference in its entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE DISCLOSURE

In many different systems, fluids are transported through conduits to serve various purposes. One such type of system is a thermal system, where the fluid can be a coolant and/or a refrigerant than is circulated to transfer thermal energy between two or more parts of the system. In an electric vehicle, the thermal system generally services an energy storage (e.g., a lithium-ion battery pack), a traction motor, other powertrain components, and a cabin environment system. The thermal system also included components to cool the fluid, i.e., radiators or chillers, and/or components to heat the fluid, i.e., heaters.

In some operations of this thermal system, all components require cooling, in other operations of this system, all components require heating, and in still other operations of this thermal system some components require heating while other components require cooling. Thus, in prior system designs, multiple differing fluid paths were used to service the heating and cooling needs of these components. Because of the complexity of routing of the fluid to service components requiring heating, to service components requiring cooling, to heat the fluid, and/or to cool the fluid, the prior thermal system designs often included many differing valves and routing paths for the fluid, which was expensive, complex, and had a high rate of failure.

BRIEF DESCRIPTION OF THE DRAWINGS

FIG. 8 is a cut-away top view of the multi-port, multi-mode valve of FIG. 7 operating in a first parallel mode according to an embodiment of the present disclosure.

FIG. 9 is a cut-away top view of the multi-port, multi-mode valve of FIG. 7 operating in a second parallel mode according to an embodiment of the present disclosure.

FIG. 10 is a cut-away top view of the multi-port, multi-mode valve of FIG. 7 operating in a parallel, blending mode according to an embodiment of the present disclosure.

FIG. 11 is a cut-away top view of the multi-port, multi-mode valve of FIG. 7 operating in a first series mode according to an embodiment of the present disclosure.

FIG. 12 is a cut-away top view of the multi-port, multi-mode valve of FIG. 7 operating in a second series mode according to an embodiment of the present disclosure.

FIG. 13 is a cut-away top view of the multi-port, multi-mode valve of FIG. 7 operating in a series, blending mode according to an embodiment of the present disclosure.

DETAILED DESCRIPTION OF THE DRAWINGS

This document describes a multi-port, multi-mode valve having a number of ports that serve as inlets and/or outlets for a fluid. The fluid is a coolant in some embodiments but may be another type of fluid in differing embodiments. Some embodiments of the multi-port, multi-mode valve use a single actuator to regulate the operational modes of the valve; in particular, the actuator can use a single actuated valve component—referred to herein as a "stemshell"—to selectively open or close fluid flow between selected pairs of ports, while simultaneously not affecting flow between other port pairs.

Some examples herein mention an electric vehicle. This includes any vehicle that at least in part powers a traction motor using electric energy stored onboard the vehicle. Solely as an example, the electric vehicle is a plug-in vehicle having a battery pack that can be charged through an external plug (e.g., from a charging station) or using regenerative power derived from the motor.

The term "coolant" is used herein to describe a "fluid" that is used to transfer heat energy. Various types of fluids may be used consistently with the teachings herein, one of them commonly referred to as a coolant. The reader should understand that the terms fluid and coolant may be used interchangeably herein with regard to the operations of the structures and systems of the present disclosure.

Figure 1:
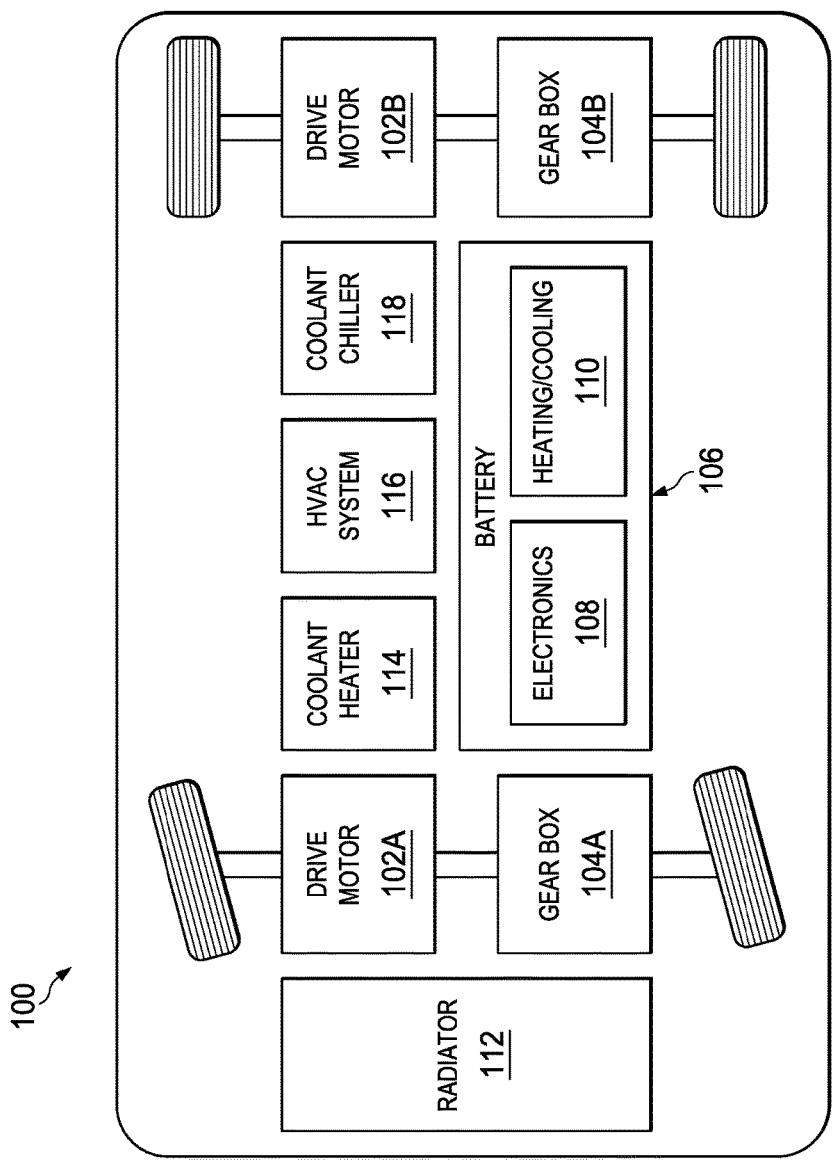
FIG. 1 is a block diagram illustrating the basic components of a battery powered electric vehicle.

FIG. 1 illustrates the basic components of a battery powered electric vehicle (electric vehicle) 100. The electric vehicle 100 includes at least one drive motor (traction motor) 102A and/or 102B, at least one gear box 104A and/or 104B coupled to a corresponding drive motor 102A and/or 102B, a battery 106, and electronics 108. Generally, the battery 106 provides electricity to the power electronics of the electric vehicle 100, which propels the electric vehicle 100 using the drive motor 102A and/or 102B and the gearbox 104A and/or 104B. The electric vehicle 100 includes a large number of other components that are not described herein but known to one of ordinary skill in the art. While the construct of the electric vehicle 100 of FIG. 1 is shown to have four wheels, differing electric vehicles may have fewer or more than four wheels. Further, differing types of electric vehicles 100 may incorporate the inventive concepts described herein, including motor cycles, aircraft, trucks, boats, train engines, among other types of vehicles.

The electric vehicle 100 also includes various heating and cooling components to control the temperature of its battery 106, its drive motor(s) 102A and 102B, its gearbox(es) 104A and 104B, its passenger compartment, and its other components. These heating and cooling components include a battery heating/cooling fluid circulation system 110, a radiator 112, coolant heater 114, an HVAC system 116 for the passenger compartment, and a coolant chiller 118. These heating and cooling components are intercoupled via piping and valves and are controlled via an electronic control system to regulate the temperature of the serviced components. According to various embodiments and teachings of the present disclosure, a multi-port, multi-mode valve intercouples a plurality of these heating and cooling components.

Figure 2:
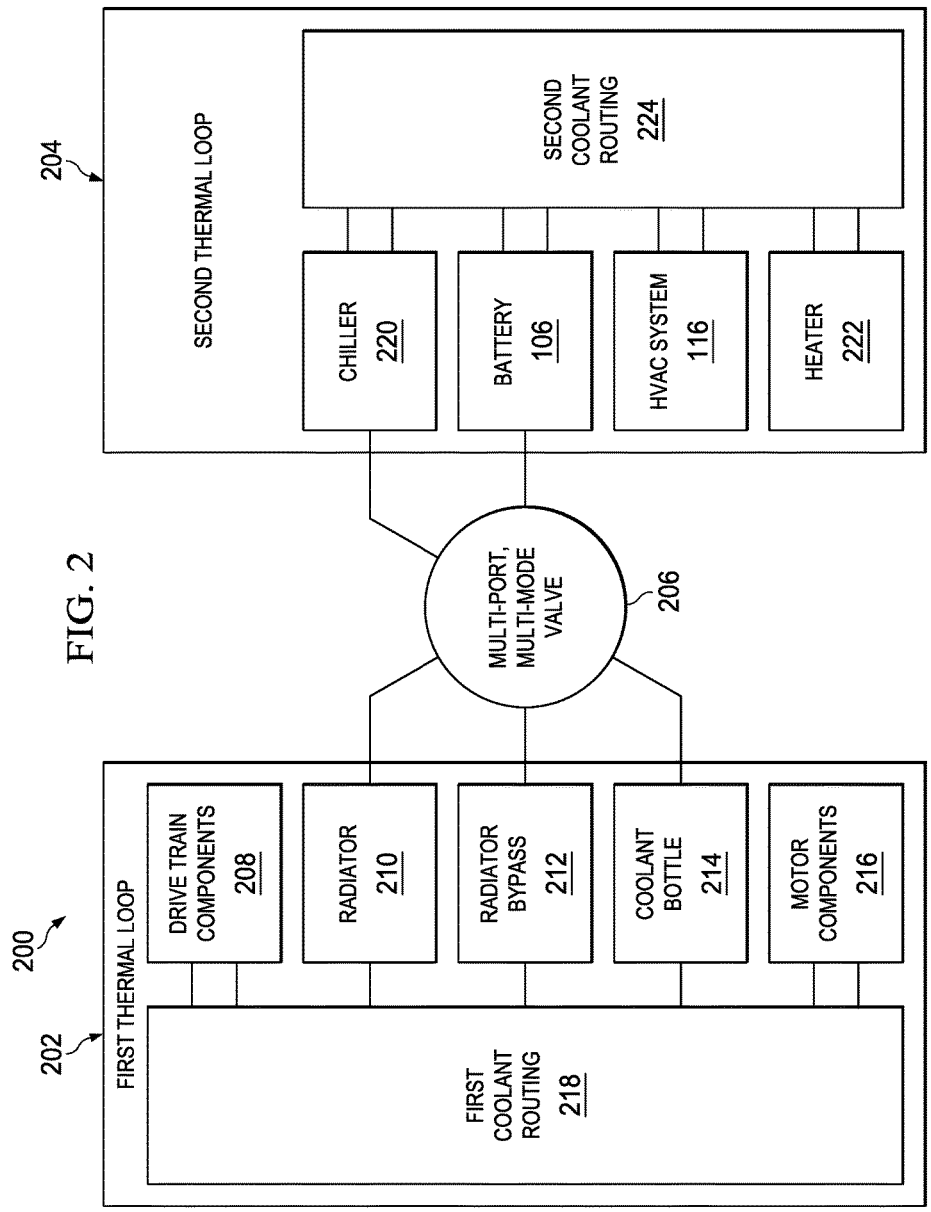
FIG. 2 is a block diagram illustrating a thermal system having a first thermal loop, a second thermal loop, and a multi-port, multi-mode valve constructed and operating according to an embodiment of the present disclosure.

FIG. 2 is a block diagram illustrating a thermal system 200 having a first thermal loop 202, a second thermal loop 204, and a multi-port, multi-mode valve 206 constructed and operating according to an embodiment of the present disclosure. The multi-port, multi-mode valve 206 is arranged for use within the thermal system 200 of an electric vehicle. The thermal system 200 includes at least a radiator 210, a radiator bypass conduit 212, a coolant bottle 214 or other reservoir, a battery 106 or other component that needs thermal servicing, and a chiller 220 or other heat exchange component that provides thermal exchange with another thermal system.

Solely as an illustrative example, the architecture of the thermal system 200 can be as follows. The radiator 210, the radiator bypass conduit 212, and the coolant bottle 214 are all part of the first thermal loop 202. For example, the first thermal loop 202 can be routed through one or more components that may need thermal servicing, including, but not limited to, one or more motors 216 or other drivetrain components 208 via first coolant routing 218. That is, in some operational modes the first thermal loop 202 serves to convey coolant through the motor components 216 where thermal exchange takes place, and thereafter through either the radiator 210 for thermal exchange with ambient air, or through the radiator bypass conduit 212. In some implementations, a blended flow of coolant through both the radiator 210 and radiator bypass conduit 212 is performed. After exiting the radiator 210 and/or the radiator bypass conduit 212, the coolant can be fed into a coolant bottle 214 which is a reservoir that accommodates thermal expansion and contraction of the coolant, before the coolant is again conveyed into the motor/drivetrain.

The thermal system 200 has a second thermal loop 204 that services components other than the motor components 216 and drive train components 208. In some implementations, the second thermal loop 204 thermally services a battery 106 or other energy storage system of an electric vehicle and/or an HVAC system 116 that services the passenger compartment of the vehicle. The second thermal loop 204 includes the battery 106 and the chiller 220 mentioned earlier, as well as the HVAC system 116 and second coolant routing 224. In some operational modes, the second thermal loop 204 serves to convey coolant through the battery 106 and through the chiller 220 for thermal exchange. In some implementations, the second thermal loop 204 includes a heater 222 for selectively providing heated coolant into the battery 106.

The multi-port, multi-mode valve 206 selectively routes fluid in differing modes. In a plurality of serviced parallel modes, the valve 206 routes fluid between components of the same thermal loop, e.g., coolant routed among components of the first thermal loop 202 and among components of the second thermal loop 204. In a plurality of serviced serial modes, the valve 206 routes coolant between the first thermal loop 202 and the second thermal loop 204. These modes of operation of the multi-port, multi-mode valve 206 will be discussed with reference to FIGS. 3-13 and 21-22. Constructs of multiple embodiments of the multi-port, multi-mode valve 206 will be described with reference to FIGS. 14-20.

Figure 3:
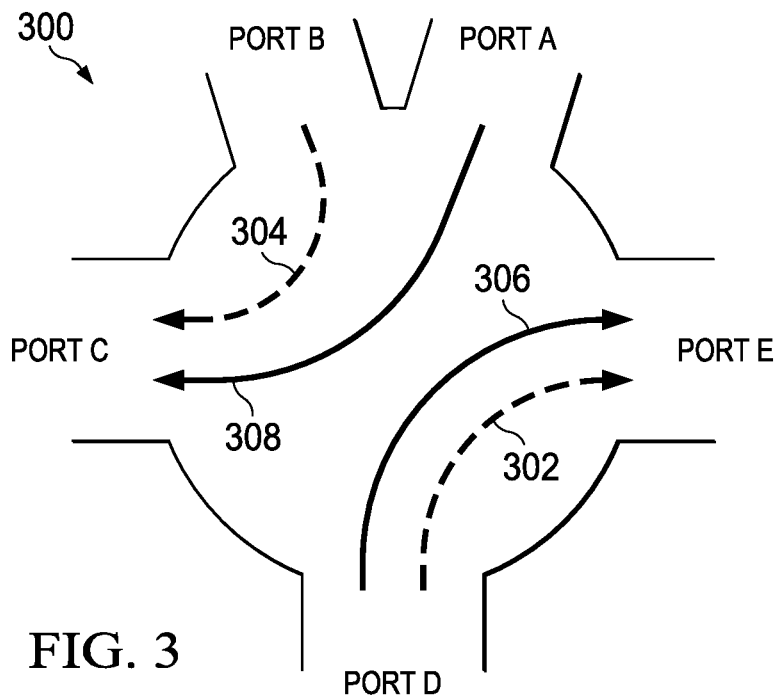
FIG. 3 is a schematic diagram illustrating a multi-port, multi-mode valve operating in two differing parallel modes according to an embodiment of the present disclosure.

FIG. 3 is a schematic diagram illustrating a multi-port, multi-mode valve 300 operating in two differing parallel modes according to an embodiment of the present disclosure. The valve 300 selectively connects the first 202 and second 204 thermal loops to each other. This embodiment of the valve 300 has five ports labeled port A through port E, respectively, and the mode in which the valve 300 operates can affect which of these ports are connected with each other. Particularly, the valve ports here are connected to the following system components:

| Port | Component or part |
|------|-------------------|
| A    | Radiator          |
| B    | Radiator bypass   |
| C    | Coolant bottle    |
| D    | Battery           |
| E    | Chiller           |

The operational modes mentioned in the above examples can include a parallel mode of operation for the valve. In some implementations, the valve is then arranged so that each of the above-mentioned first 202 and second 204 thermal loops forms a separate circulating system that does not exchange coolant with the other. For example, in the parallel mode the ports D and E are always connected to each other via coolant flow paths 302 and 306 so as to circulate the coolant within the second thermal loop.

The other three ports, on the other hand, can selectively have open or closed channels while the valve is in parallel mode. This can affect the flow of fluid through the first thermal loop 202. For example, port A can be connected to port C so as to provide fluid flow through the radiator via coolant flow path 308. As another example, port B can be connected to port C so as to bypass the radiator via coolant flow path 304. Combinations between the two can be used.

In accordance with the above, FIG. 3 illustrates two configurations: Full Radiator and Radiator Bypass, respectively. These are associated with respective arrows representing fluid flow through the radiator. Here, the arrows corresponding to the Full Radiator configuration illustrate a coolant flow path 308 from port A to port C, and a coolant flow path 306 from port D to port E. These arrows exemplify the direction that fluid can be flowing; in some implementations, the fluid can flow in the opposite direction in any or all of the channels.

The arrows corresponding to the Radiator Bypass mode, moreover, illustrate a coolant flow path 304 from port B to port C, and, again, a coolant flow path 302 from port D to port E. That is, switching from the Full Radiator configuration to the Radiator Bypass configuration here affects the flow with regard to port C (that is, connecting it to either of port A or B), but does not alter the flow between ports D and E. This change of configuration within the parallel mode can be accomplished using a single actuator, as will be exemplified below.

Figure 4:
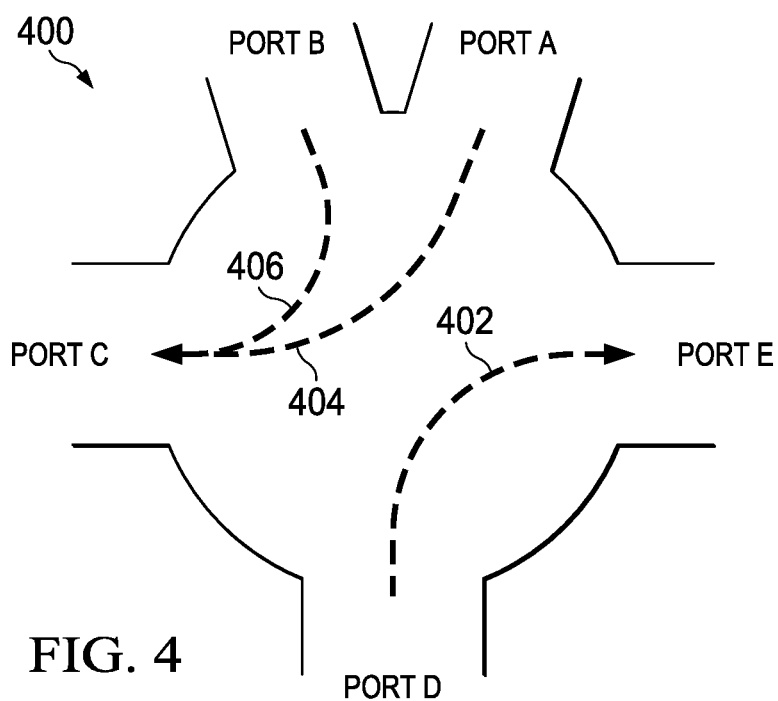
FIG. 4 is a schematic diagram illustrating a multi-port, multi-mode valve operating in a parallel, blending mode according to an embodiment of the present disclosure.

FIG. 4 is a schematic diagram illustrating a multi-port, multi-mode valve operating in a parallel, blending mode 400 according to an embodiment of the present disclosure. This configuration involves connecting both port A and port B to port C, as indicated by arrows 404 and 406. The example is referred to as Blend Configuration 1/2, because it is a blend between the configurations 1 and 2 mentioned earlier. The rate of blending can vary in any relative proportions between the ports A and B. Port D and E, moreover, are connected to each other as in other configurations of the parallel mode as indicated by arrow 402. That is, the Blend Configuration also supports selective proportioning of the relative amounts of flow to/from the ports A and B, without affecting the flow between ports D and E.

Figure 5:
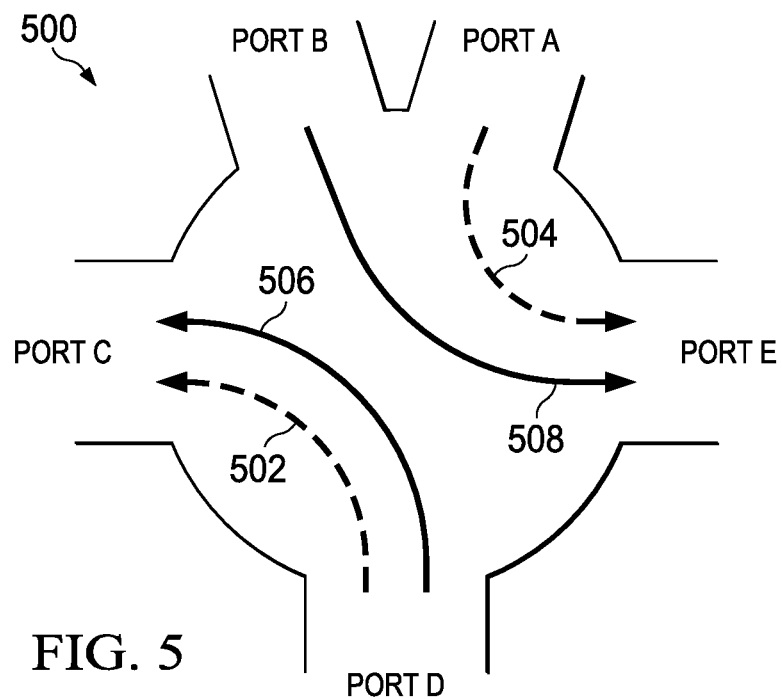
FIG. 5 is a schematic diagram illustrating a multi-port, multi-mode valve operating in two differing series modes according to an embodiment of the present disclosure.

FIG. 5 is a schematic diagram illustrating a multi-port, multi-mode valve operating in two differing series modes 500 according to an embodiment of the present disclosure. This example involves the same valve as in the earlier examples. The term serial indicates that the mode involves a serialized coupling between the first and second thermal loops mentioned above. For example, the valve can be placed in serial mode so as to direct the flow from the first thermal loop onto the second thermal loop, and to direct the flow from the second thermal loop into the first thermal loop. This can allow the thermal loops to serve as one continuous loop of coolant; that is, the same coolant then flows serially through both thermal loops.

In analogy with the examples above, this mode can also include more than one configuration of the valve. In FIG. 5, two configurations are indicated: Full Radiator (i.e., configuration 3) and Radiator Bypass (i.e., configuration 4). Here, arrows corresponding to the Full Radiator configuration illustrate a coolant flow path 504 from port A to port E, and a coolant flow path 502 from port D to port C. The arrows corresponding to the Radiator Bypass mode, moreover, illustrate a coolant flow path 508 from port B to port E, and, again, a coolant flow path 506 from port D to port C. That is, switching from the Full Radiator configuration to the Radiator Bypass configuration here affects the flow with regard to port E (that is, connecting it to either of port A or B), but does not alter the flow between ports D and C. This change of configuration within the serial mode can be accomplished using a single actuator, as will be exemplified below.

Figure 6:
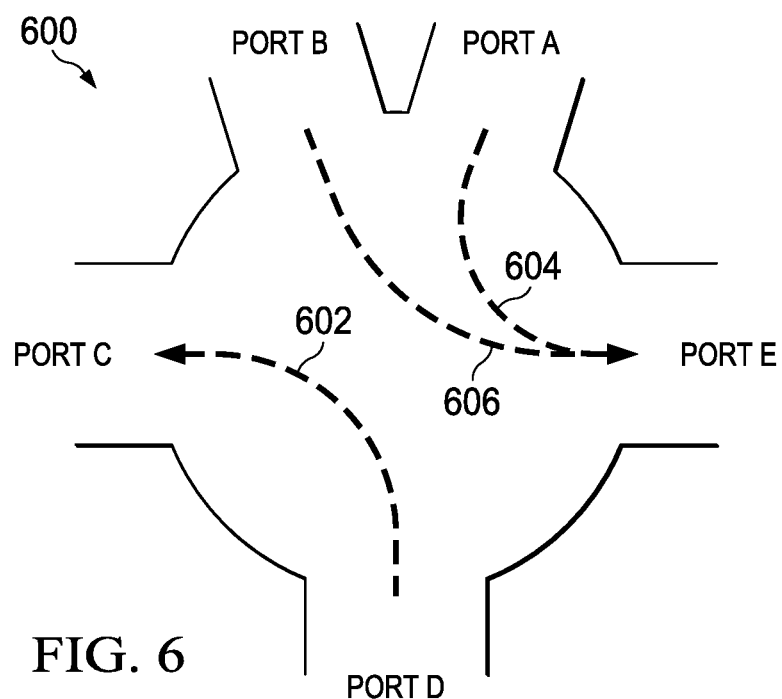
FIG. 6 is a schematic diagram illustrating a multi-port, multi-mode valve operating in a series, blending mode according to an embodiment of the present disclosure.

FIG. 6 is a schematic diagram illustrating a multi-port, multi-mode valve operating in a series, blending mode 600 according to an embodiment of the present disclosure. In analogy with the earlier example, FIG. 6 here shows an example of blending while in serial mode. That is, this configuration involves connecting both port A and port B to port E, as indicated by arrows 604 and 606. The example is referred to as Blend Configuration 3/4, because it is a blend between the configurations 3 and 4 mentioned earlier. The rate of blending can vary in any relative proportions between the ports A and B. Port D and C, moreover, are connected to each other as in other configurations of the parallel mode as shown via arrow 602. That is, the Blend Configuration 3/4 can allow selective proportioning of the relative amounts of flow to/from the ports A and B, without affecting the flow between ports D and C.

Figure 7:
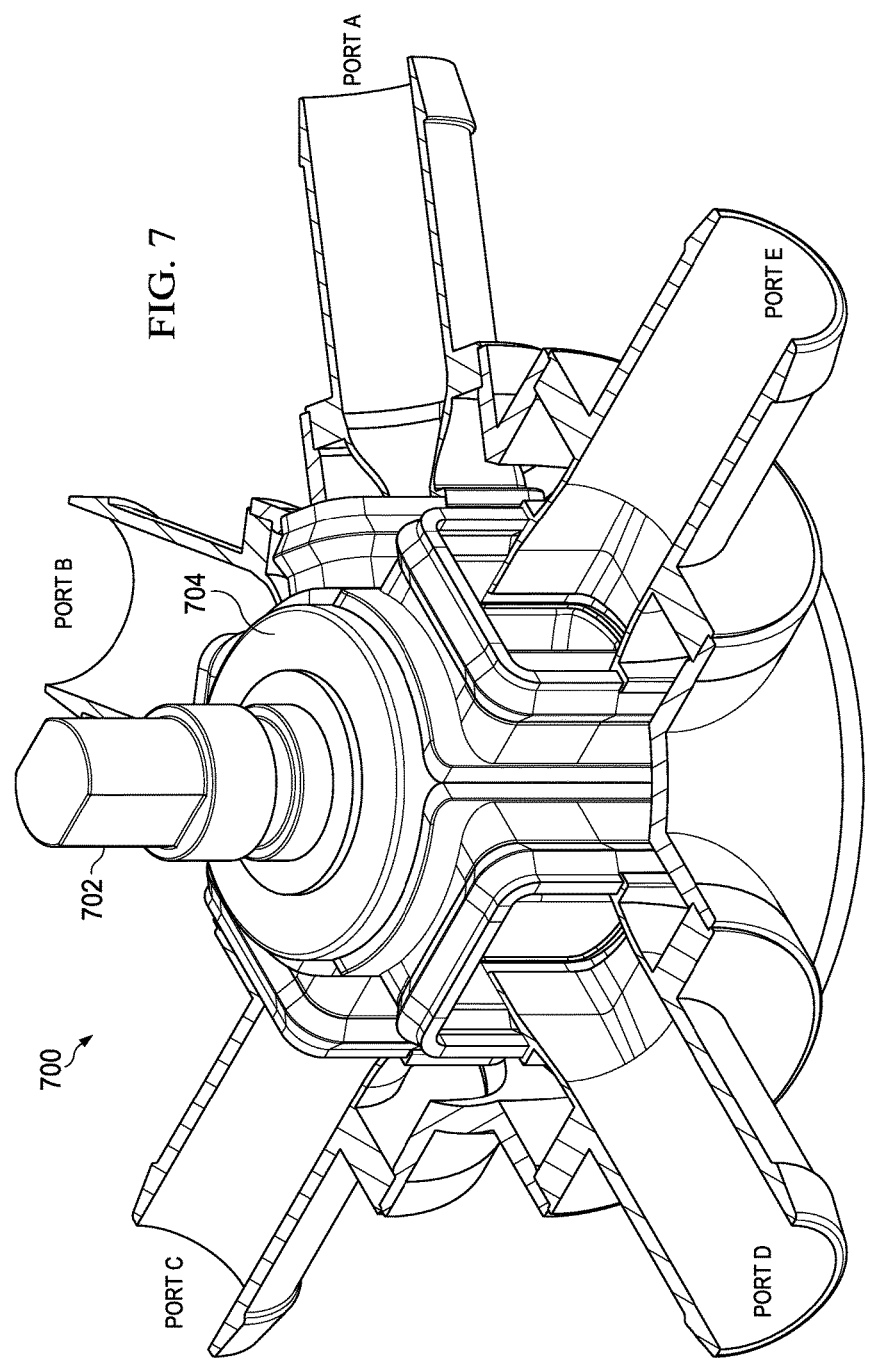
FIG. 7 is a transparent perspective view of a multi-port, multi-mode valve constructed according to an embodiment of the present disclosure.

FIG. 7 is a transparent perspective view of a multi-port, multi-mode valve constructed according to an embodiment of the present disclosure. The valve 700 here has five ports A, B, C, D, and E that converge on a common hub. The ports and the hub are here shown in partially transparent view to reveal some inner structures. The ports are here arranged essentially in a common plane and this example is therefore characterized as having a planar design. The ports can correspond to the ports A and B, respectively, in the earlier examples. That is, the valve 700 can provide for selective apportioning of the flow with regard to these ports—in either a parallel or a serial mode—without affecting the flow with regard to another pair of the ports.

A shaft 702 extends away from the hub housing and is connected to a stemshell 704 positioned therein. Examples of the stemshell 704 will be described below. The shaft 702 can be rotated in either direction so as to set the stemshell in different positions. The shaft 702 positions correspond to whether the valve 700 is operated in parallel or serial mode, as well as to the respective configurations within either of such modes. The shaft 702 can be controlled using any suitable actuator, such as a logically controlled motor actuator. In some implementations, by providing the actuator with a suitable input signal it can be caused to rotate an arbitrary amount in either direction. Solely as illustrative examples, such signal can specify the direction and the amount of rotation to be performed by the actuator, or the signal can merely serve as an impulse to trigger the actuator to perform a predefined change of configuration (e.g., step to the next predefined configuration).

FIG. 8 is a cut-away top view 800 of the multi-port, multi-mode valve of FIG. 7 operating in a first parallel mode according to an embodiment of the present disclosure. In FIG. 7, the stemshell has channels of arcuate shape that run through it. These channels create a pathway from one or more ports into one or more other ports, for example as described herein. Here, one arrow 804 schematically illustrates fluid flow between ports A and C (e.g., from radiator to cooling bottle) in a first channel. That is, the position of the stemshell here closes off the opening of the port B. Similarly, another arrow 802 schematically illustrates flow between ports D and E (e.g., between battery and chiller) in a second channel. Accordingly, this setting of the stemshell corresponds to the exemplary first configuration within the parallel mode. For example, this can, on the one hand, allow first coolant to circulate from the radiator to the coolant bottle and from then via one or more components that need thermal servicing (e.g., a motor) before again going through the radiator, and, on the other hand, can allow second coolant to circulate from the battery to the chiller and thereafter eventually back into the battery.

The first channel has a first end currently facing port A. Viewed in cross section, the first end can be said to extend from a proximal edge across to a distal edge. The port A, moreover, at its end closest to the stemshell, can likewise be said to extend from a proximal edge across to a distal edge. In the current configuration, the distal edge of the first end of the first channel is essentially abutting the distal edge of the port A; similarly, the proximal edge of the first end of the first channel is essentially abutting the proximal edge of the port A.

Similarly, the first channel has a second end currently facing port C. Viewed in cross section, the second end can be said to extend from a proximal edge across to a distal edge. The port C, moreover, at its end closest to the stemshell, can likewise be said to extend from a proximal edge across to a distal edge. In the current configuration, the proximal edge of the second end of the first channel is currently essentially abutting the proximal edge of the port C; similarly, the distal edge of the second end of the first channel is essentially intermediate the proximal and distal edges of the port C.

FIG. 9 is a cut-away top view 900 of the multi-port, multi-mode valve of FIG. 7 operating in a second parallel mode according to an embodiment of the present disclosure. Particularly, the stemshell has now been rotated counter-clockwise so that the first channel instead connects port B to port C indicated via arrow 904. For example, this can involve a change from running the fluid through one component (e.g., a radiator) to instead bypassing that component. That is, the position of the stemshell here closes off the opening of the port A. Meanwhile, in this example the rotation does not affect the coupling of ports D and E to each other as indicated via arrow 902. Namely, after the rotation the second channel is still in fluid communication with the respective openings of the ports D and E as it was in the previous configuration, and therefore this aspect of the fluid flow is essentially unaffected by the change in configuration. For example, this can, on the one hand, allow first coolant to bypass the radiator before entering the coolant bottle and from then run via one or more components that need thermal servicing (e.g., a motor) before again bypassing the radiator, and, on the other hand, can allow second coolant to circulate from the battery to the chiller and thereafter eventually back into the battery.

It is the first channel that currently provides the fluid communication between the port B and the port C. With an equivalent nomenclature as that used for the port A, the port B at its end closest to the stemshell can be said to extend from a proximal edge across to a distal edge. Particularly, the distal edge of the first end of the first channel is currently essentially abutting the distal edge of the port B; similarly, the proximal edge of the first end of the first channel is essentially abutting the proximal edge of the port B. Meanwhile, the distal edge of the second end of the first channel is currently essentially abutting the distal edge of the port C; similarly, the proximate edge of the second end of the first channel is essentially intermediate the proximal and distal edges of the port C.

FIG. 10 is a cut-away top view 1000 of the multi-port, multi-mode valve of FIG. 7 operating in a parallel, blending mode according to an embodiment of the present disclosure. FIG. 10 shows an example of setting the stemshell in a position somewhere between the previous two configurations, so as to achieve a blended flow of some proportion. Here, a part of the opening of the first channel faces the port B and another part of the opening faces the port C. As such, the port C in this example receives a blend of fluids coming through the ports A and B as indicated via arrows 1004 and 1006. Meanwhile, the fluid flow between the ports D and E is essentially unaffected by the change in configuration as indicated via arrow 1002.

FIG. 11 is a cut-away top view 1100 of the multi-port, multi-mode valve of FIG. 7 operating in a first series mode according to an embodiment of the present disclosure. FIG. 11 shows an example of the valve from FIG. 7 being operated in serial mode. This is effectuated by rotating the stemshell into a position so that the first channel therein instead faces the respective openings of ports A and E, and so that the second channel faces the openings of ports C and D. That is, the position of the stemshell here closes off the opening of the port B. For example, this can cause the radiator (e.g., in the first thermal loop) to be coupled to the chiller (e.g., in the second thermal loop), and the battery (e.g., in the second thermal loop) to be coupled to the coolant bottle (e.g., in the first thermal loop). For example, this can, on the one hand, allow coolant to circulate from the radiator to the chiller (i.e., via port A to port E indicated by arrow 1102) and then into the battery, and from the battery to the coolant bottle (i.e., via port D to port C indicated by arrow 1104) and thereafter via one or more components that need thermal servicing (e.g., a motor) eventually back into the radiator.

FIG. 12 is a cut-away top view 1200 of the multi-port, multi-mode valve of FIG. 7 operating in a second series mode according to an embodiment of the present disclosure. FIG. 12 shows the valve in another configuration within serial mode. The stemshell has now been rotated so that the first channel connects port B and port E with each other as indicated via line 1204, while maintaining the coupling between ports C and D as indicated via line 1202. That is, this can allow the serial coupling between the first and second thermal loops to remain while simultaneously bypassing the radiator.

FIG. 13 is a cut-away top view 1300 of the multi-port, multi-mode valve of FIG. 7 operating in a series, blending mode according to an embodiment of the present disclosure. FIG. 13 shows an example of an intermediate setting between the most recent two configurations. That is, this configuration can allow a blended proportion of fluid from the radiator and the radiator bypass to be fed into the chiller, while maintaining the coupling between the battery and the coolant bottle. Arrow 1302 shows the flow of fluid from port D to port C, arrow 1304 shows the flow of fluid from port A to port E, and arrow 1306 shows the flow of fluid from port B to port E.

Figure 14A:
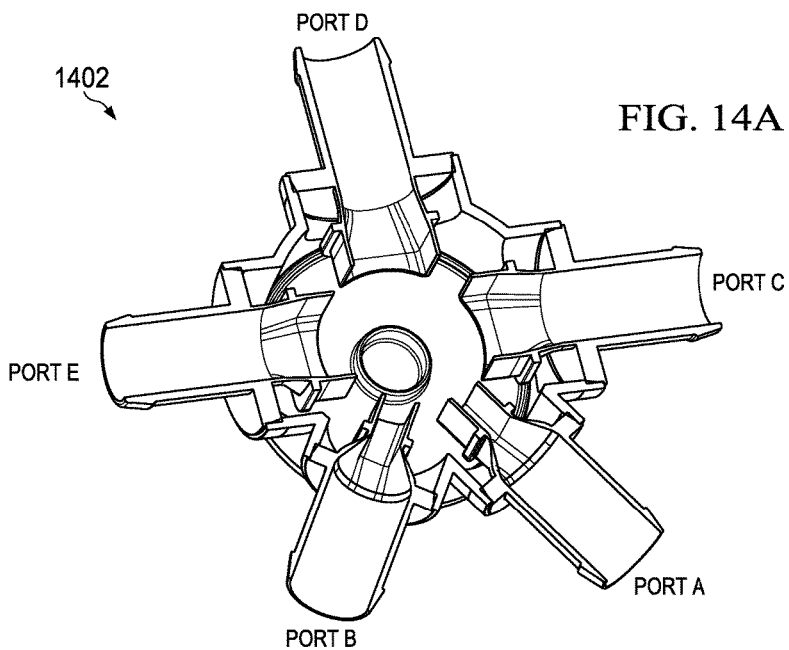
FIGS. 14A and 14B are perspective views illustrating top and bottom clamshell portions of the housing of a multi-port, multi-mode valve constructed according to one or more embodiments of the present disclosure.
Figure 14B:
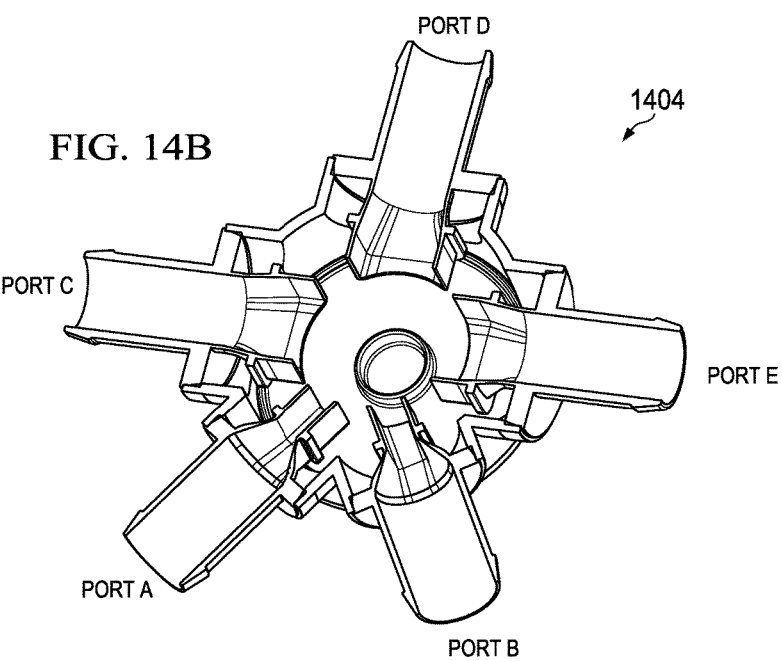

FIGS. 14A and 14B are perspective views illustrating top and bottom clamshell portions of the housing of a multi-port, multi-mode valve constructed according to one or more embodiments of the present disclosure. The valve can be manufactured and assembled in multiple different ways. Some implementations involve clamshells that can be joined to each other to form the ports and/or the hub. FIG. 14A shows an example of a top clamshell and FIG. 14B shows an example of a bottom clamshell. Any material of suitable formability that is compatible with the intended type of fluid can be used. In some implementations, the clamshell can include a plastic material, for example shaped using an injection molding process.

Figure 15C:
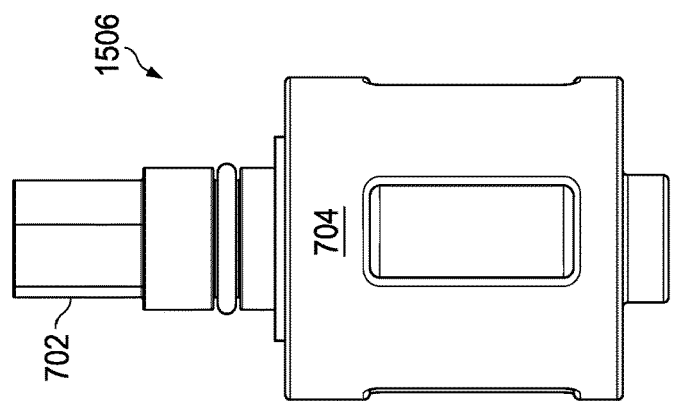
FIG. 15C is a perspective side view of a channel portion of a stemshell of a multi-port, multi-mode valve constructed according to one or more embodiments of the present disclosure.
Figure 15B:
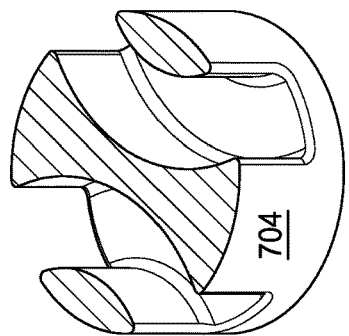
FIG. 15B is a sectional perspective view of a channel portion of a stemshell of a multi-port, multi-mode valve constructed according to one or more embodiments of the present disclosure.
Figure 15A:
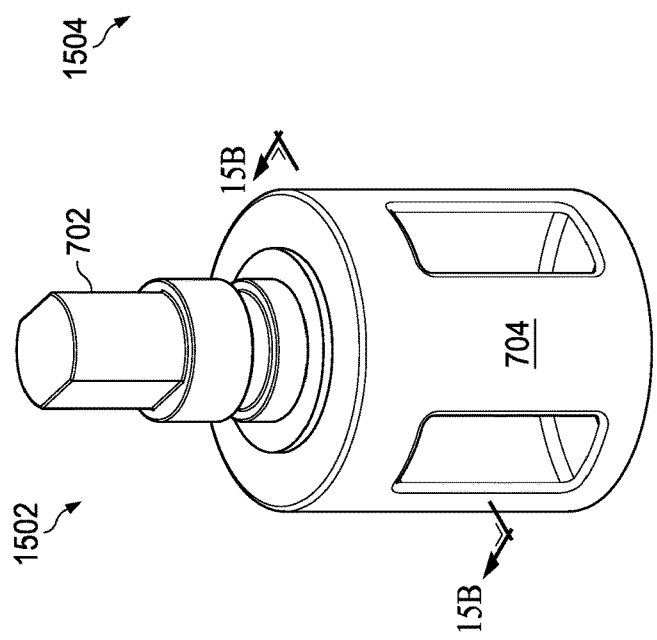
FIG. 15A is a perspective view of a stemshell of a multi-port, multi-mode valve constructed according to one or more embodiments of the present disclosure.

FIG. 15A is a perspective view of a stemshell of a multi-port, multi-mode valve constructed according to one or more embodiments of the present disclosure. FIG. 15B is a sectional perspective view of a channel portion of a stemshell of a multi-port, multi-mode valve constructed according to one or more embodiments of the present disclosure. FIG. 15C is a perspective side view of a channel portion of a stemshell of a multi-port, multi-mode valve constructed according to one or more embodiments of the present disclosure.

FIGS. 15A, 15B, and 15C show views of the stemshell 704 and the shaft 702. FIG. 15A shows a perspective view 1502 of the stemshell 704 and shaft 702 while FIG. 15B shows a cross section 1504 that illustrates respective arcuate channels within the stemshell 704. FIG. 15C is a side view 1506 that shows an opening of one of the channels. The stemshell 704 can be made of any suitable material, including, but not limited to, an injection molded plastic material.

Figure 16B:
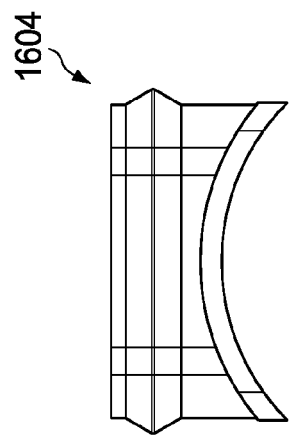
FIG. 16B is a top view of the port seal of FIG. 16A of the multi-port, multi-mode valve constructed according to one or more embodiments of the present disclosure.
Figure 16C:
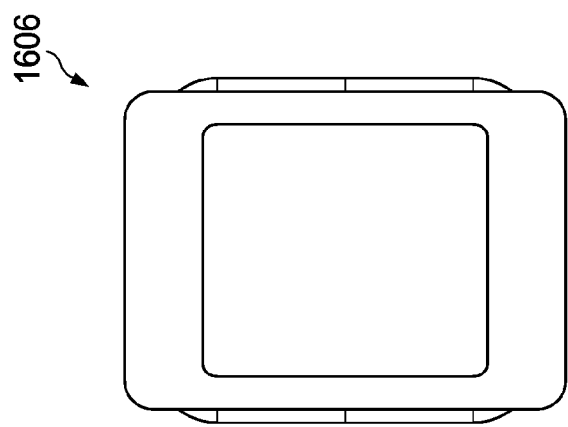
FIG. 16C is a side view of the port seal of FIG. 16A of the multi-port, multi-mode valve constructed according to one or more embodiments of the present disclosure.
Figure 16A:
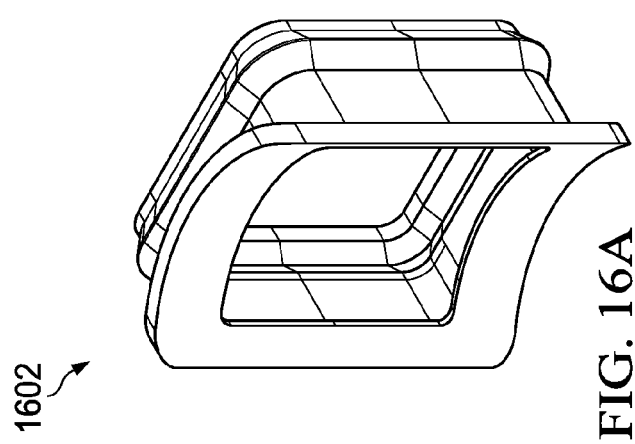
FIG. 16A is a perspective view of a port seal of a multi-port, multi-mode valve constructed according to one or more embodiments of the present disclosure.

FIG. 16A is a perspective view 1602 of a port seal of a multi-port, multi-mode valve constructed according to one or more embodiments of the present disclosure. FIG. 16B is a top view 1604 of the port seal of FIG. 16A of the multi-port, multi-mode valve constructed according to one or more embodiments of the present disclosure. FIG. 16C is a side view 1606 of the port seal of FIG. 16A of the multi-port, multi-mode valve constructed according to one or more embodiments of the present disclosure.

In some implementations, the port seal can be used to seal between a stemshell and a port inside a multi-port, multi-mode valve. For example, this port seal can be used with each of the ports C, D and E in the above examples. In some situations, these can be characterized as normal ports in that their fluid coupling is not necessarily affected by a switch from one configuration to another (e.g., within either of the parallel or serial modes). The port seal can be manufactured of any suitable material that provides sufficient sealing against the stemshell.

Figure 17B:
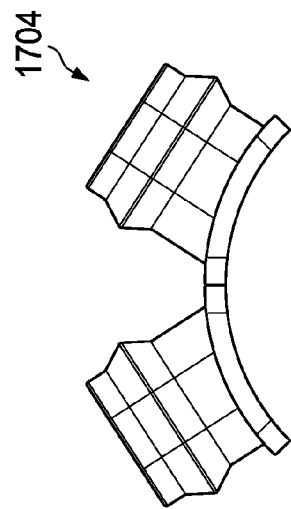
FIG. 17B is a top view of the second port seal of FIG. 17A of the multi-port, multi-mode valve constructed according to one or more embodiments of the present disclosure.
Figure 17C:
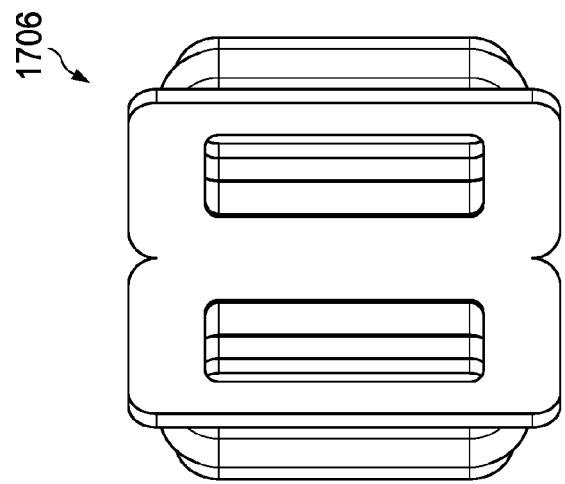
FIG. 17C is a side view of the second port seal of FIG. 17A of the multi-port, multi-mode valve constructed according to one or more embodiments of the present disclosure.
Figure 17A:
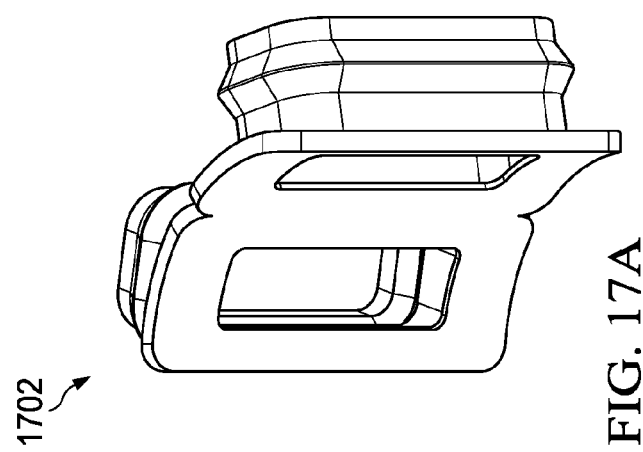
FIG. 17A is a perspective view of a second port seal of a multi-port, multi-mode valve constructed according to one or more embodiments of the present disclosure.

FIG. 17A is a perspective view 1702 of a second port seal of a multi-port, multi-mode valve constructed according to one or more embodiments of the present disclosure. FIG. 17B is a top view 1704 of the second port seal of FIG. 17A of the multi-port, multi-mode valve constructed according to one or more embodiments of the present disclosure. FIG. 17C is a side view 1706 of the second port seal of FIG. 17A of the multi-port, multi-mode valve constructed according to one or more embodiments of the present disclosure. In some implementations, the port seal can be used to port seal between a stemshell and multiple ports inside a multi-port, multi-mode valve. For example, this port seal can be used with each of the ports A and B in the above examples.

Figure 18A:
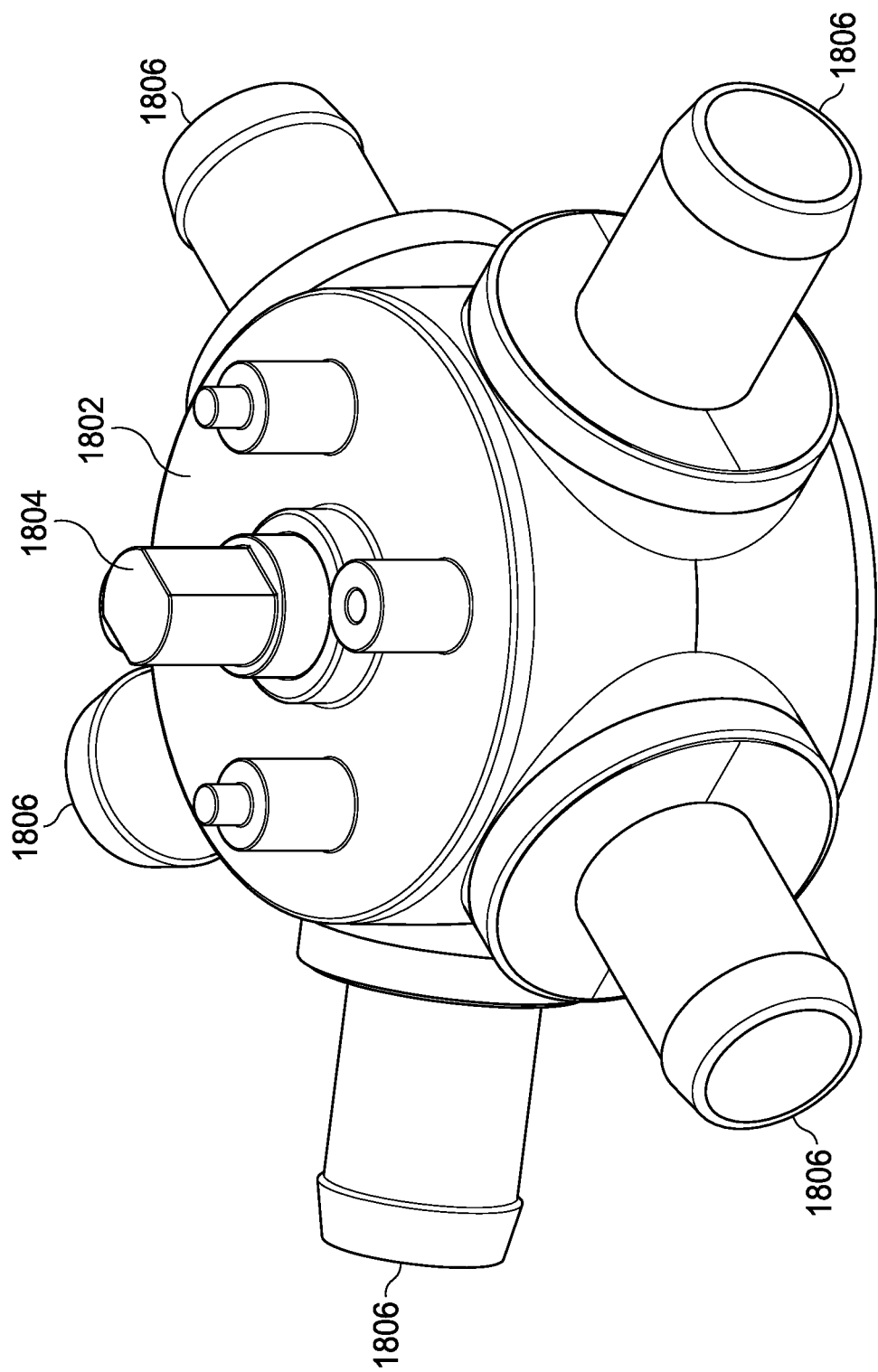
FIG. 18A is a perspective view of a multi-port, multi-mode valve constructed according to one or more embodiments of the present disclosure illustrating the connection of ports to the valve body.
Figure 18B:
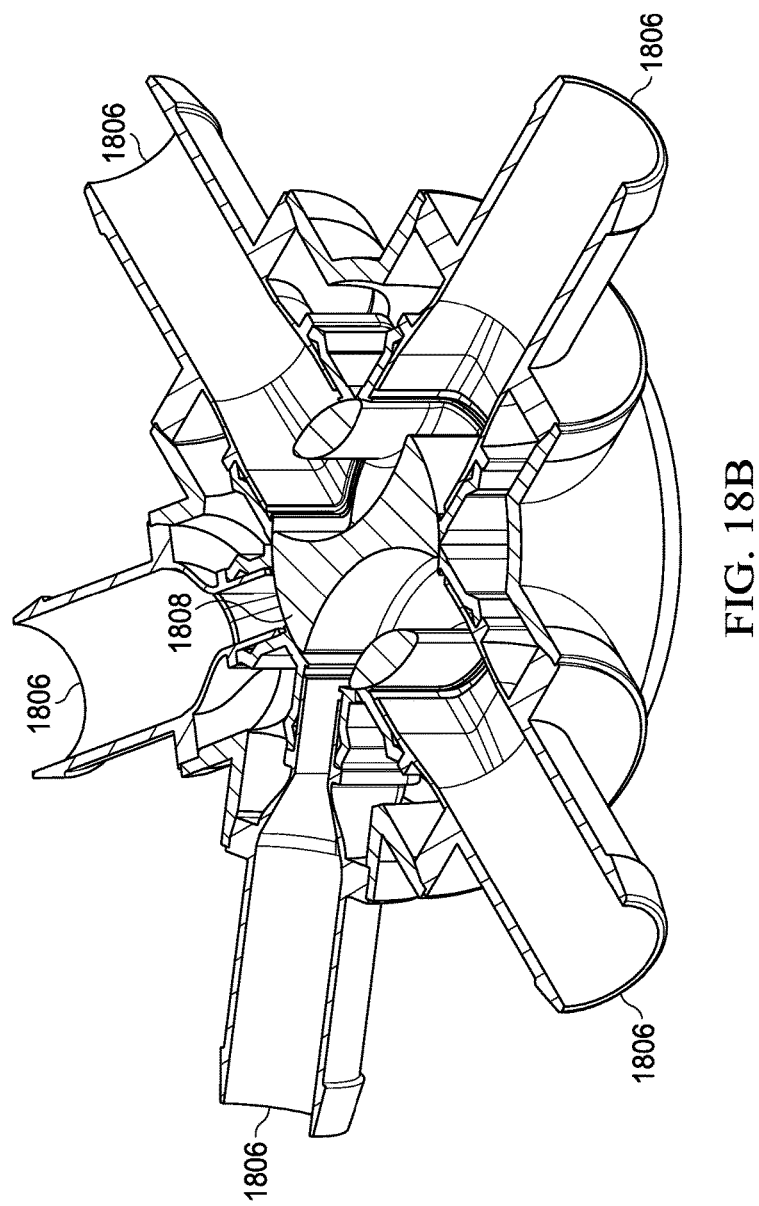
FIG. 18B is a perspective cut-away view of a multi-port, multi-mode valve constructed according to one or more embodiments of the present disclosure illustrating it's stem-shell channel portion.

FIG. 18A is a perspective view of a multi-port, multi-mode valve constructed according to one or more embodiments of the present disclosure illustrating the connection of ports to the valve body. FIG. 18B is a perspective cut-away view of a multi-port, multi-mode valve constructed according to one or more embodiments of the present disclosure illustrating it's stemshell channel portion.

The valve has a body 1802, a shaft 1804, and respective ports 1806. Each of the ports can originally be a separate component that is attached to the body during assembly. In some implementations, mutual flanges on the port and the body are used in the attachment. For example, the attachment can involve ultrasonic welding. The valve has a stemshell 1808 that provides respective arcuate channels for selectively coupling two or more ports to any other one or more ports in the valve.

Figure 19B:
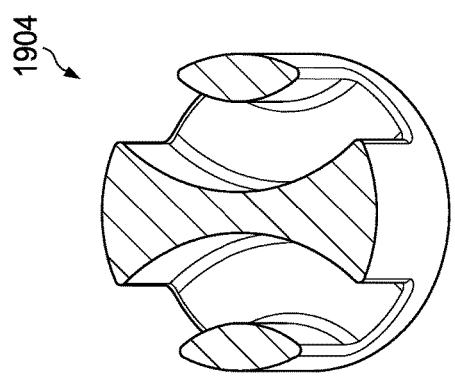
FIG. 19B is a bottom view of a channel portion of a stem-shell of a multi-port, multi-mode valve constructed according to one or more embodiments of the present disclosure.
Figure 19A:
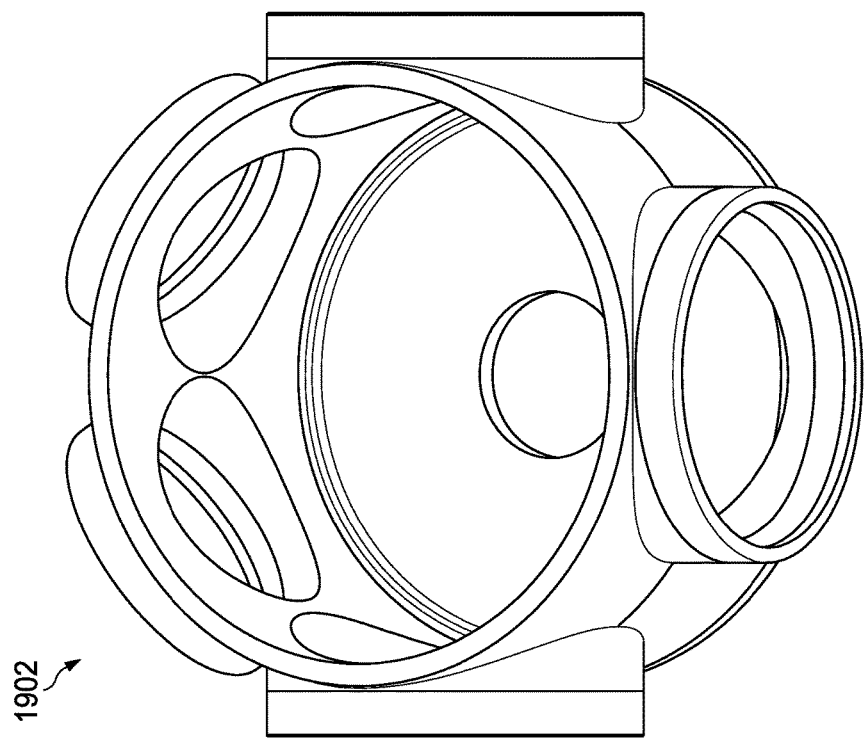
FIG. 19A is a perspective cut-away view of a body of a multi-port, multi-mode valve constructed according to one or more embodiments of the present disclosure.

FIG. 19A is a perspective cut-away view 1902 of a body of a multi-port, multi-mode valve constructed according to one or more embodiments of the present disclosure. FIG. 19B is a bottom view 1904 of a channel portion of a stem-shell of a multi-port, multi-mode valve constructed according to one or more embodiments of the present disclosure.

Figure 20:
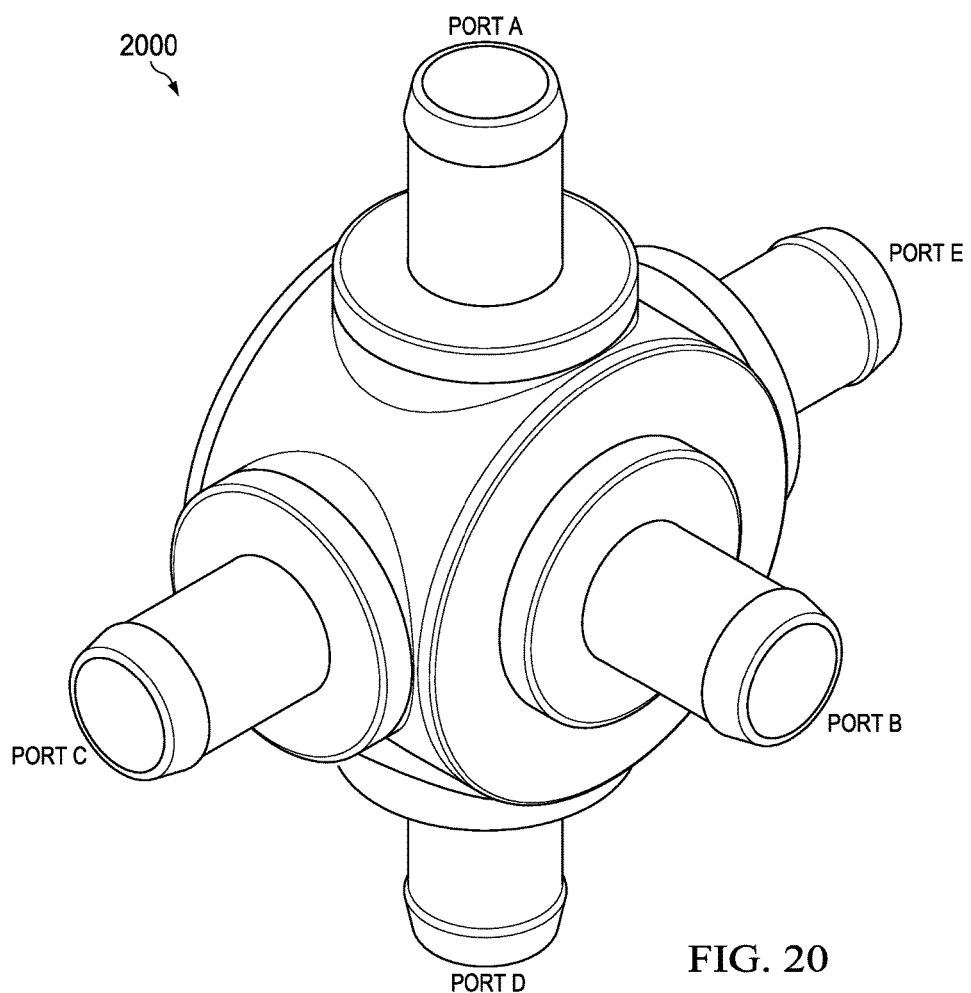
FIG. 20 is a perspective view of a second embodiment of multi-port, multi-mode valve constructed according to one or more embodiments of the present disclosure.

FIG. 20 is a perspective view 2000 of a second embodiment of multi-port, multi-mode valve constructed according to one or more embodiments of the present disclosure. The valve has a number of ports labeled A through E, respectively. Solely as an example, port A can be coupled to a radiator, port B to a radiator bypass, port C to a coolant bottle, port D to a battery, and port E to a chiller. Most of the ports are oriented in a plane, such as the exemplary port 2002. At least one of the ports, however, can have a different orientation. In some implementations, port 2004 can be oriented at an angle relative to the plane, such as at approximately a right angle. For example, the port B can be co-axial with a shaft for rotating the stemshell of the valve.

Figure 21:
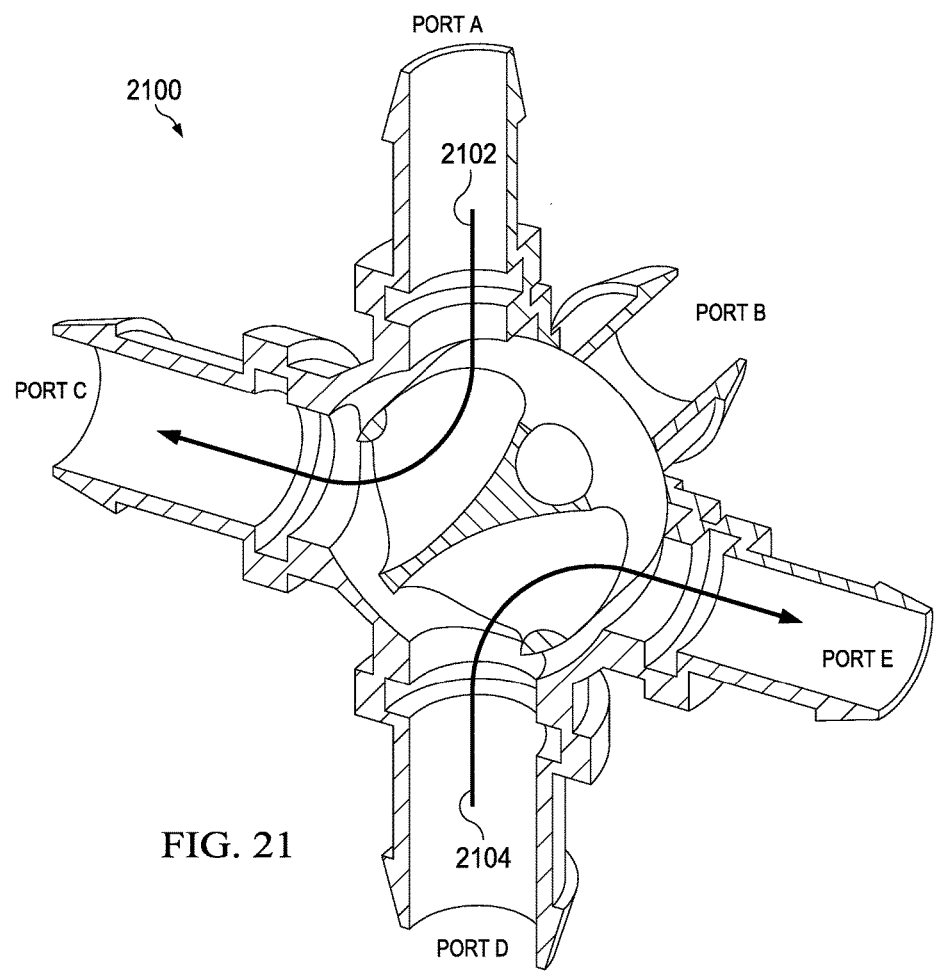
FIG. 21 is a perspective semi-transparent view of a multi-port, multi-mode valve constructed according to one or more embodiments of the present disclosure in a first configuration.

FIG. 21 is a perspective semi-transparent view 2100 of a multi-port, multi-mode valve constructed according to one or more embodiments of the present disclosure in a first configuration. The section of FIG. 21 is taken through the plane formed by some of the ports. Namely, ports A, C, D and E are here shown sectioned so as to reveal the inside of the valve body. The valve has a stemshell 2106 that is rotatable within the housing (e.g., about an axis). Currently the stemshell 2106 has been rotated into a position that corresponds to a parallel mode of operation. Here, the configuration involves coupling the radiator (port A) to the coolant bottle (port C), and the battery (port D) to the chiller (port E). In particular, a channel 2102 in the stemshell connects the ports A and C to each other and another channel 2104 in the stemshell connects the ports D and E to each other. Port B, on the other hand, is blocked by the stemshell in its current position. That is, a channel (not separately illustrated) has one of its ends open toward the port B but its other end is currently not open toward any of the other ports; rather, the other end can be closed by the inside of the valve body. As a result of this valve configuration, in the current parallel mode of operation the fluid in the first thermal loop of the thermal system flows through the radiator; the radiator bypass is therefore currently not used for fluid flow.

Figure 22:
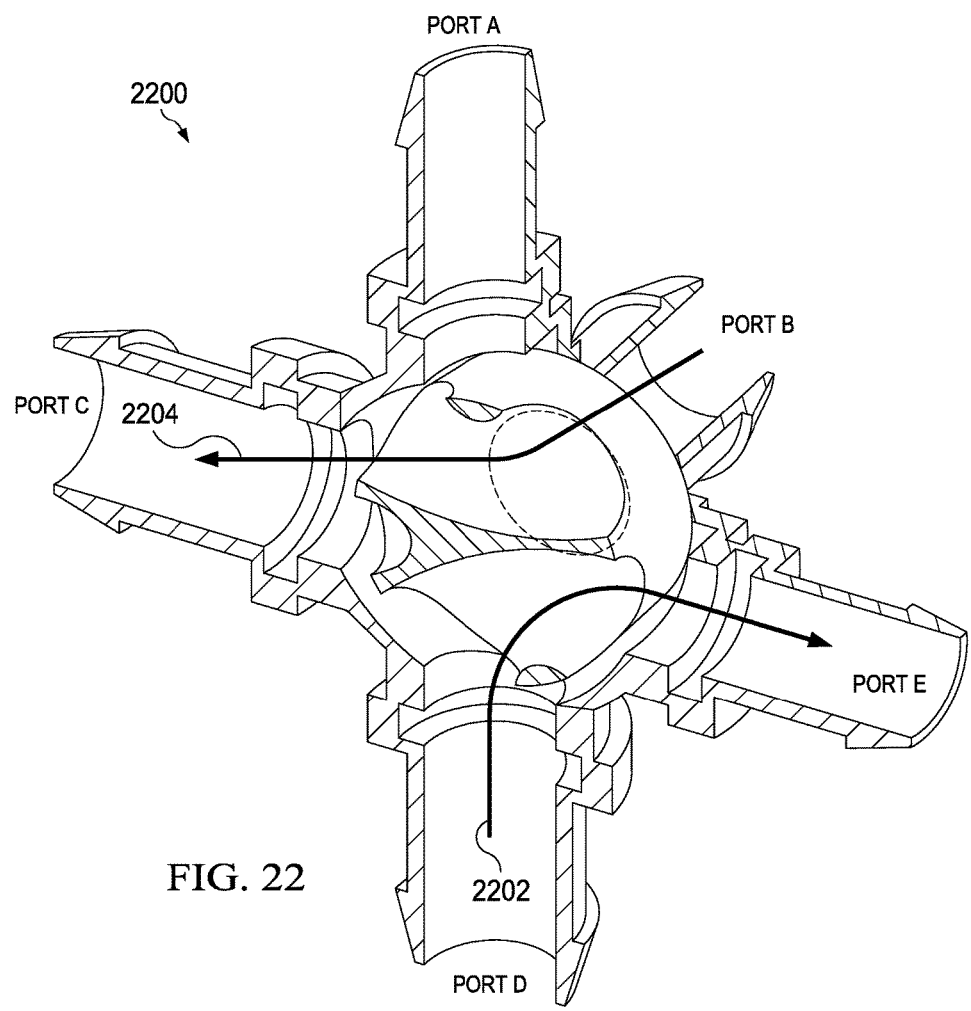
FIG. 22 is a perspective semi-transparent view of a multi-port, multi-mode valve constructed according to one or more embodiments of the present disclosure in a second configuration.

FIG. 22 is a perspective semi-transparent view 2200 of a multi-port, multi-mode valve constructed according to one or more embodiments of the present disclosure in a second configuration. In FIG. 22, the stemshell has been rotated so that the fluid channel 2204 that is open toward the port B is currently also open toward port C. In some implementations, this is done without significantly affecting the fluid flow between at least another pair of ports. For example, the channel 2202 can now connect the ports D and E to each other. As a result of this valve configuration, in the current parallel mode of operation the fluid in the first thermal loop of the thermal system bypasses the radiator; the radiator is therefore currently not used for fluid flow.

In the foregoing specification, the invention has been described with reference to specific embodiments. However, as one skilled in the art will appreciate, various embodiments disclosed herein can be modified or otherwise implemented in various other ways without departing from the spirit and scope of the invention. Accordingly, this description is to be considered as illustrative and is for the purpose of teaching those skilled in the art the manner of making and using various embodiments of the disclosed system, method, and computer program product. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure.

Routines, methods, steps, operations, or portions thereof described herein may be implemented through electronics, e.g., one or more processors, using software and firmware instructions. A "processor" includes any hardware system, hardware mechanism or hardware component that processes data, signals or other information. A processor can include a system with a central processing unit, multiple processing units, dedicated circuitry for achieving functionality, or other systems. Some embodiments may be implemented by using software programming or code in one or more digital computers or processors, by using application specific integrated circuits (ASICs), programmable logic devices, field programmable gate arrays (FPGAs), optical, chemical, biological, quantum or nano-engineered systems, components and mechanisms. Based on the disclosure and teachings representatively provided herein, a person skilled in the art will appreciate other ways or methods to implement the disclosure.

As used herein, the terms "comprises," "comprising," "includes," "including," "has," "having" or any contextual variants thereof, are intended to cover a non-exclusive inclusion. For example, a process, product, article, or apparatus that comprises a list of elements is not necessarily limited to only those elements, but may include other elements not expressly listed or inherent to such process, product, article, or apparatus. Further, unless expressly stated to the contrary, "or" refers to an inclusive or and not to an exclusive or. For example, a condition "A or B" is satisfied by any one of the following: A is true (or present) and B is false (or not present), A is false (or not present) and B is true (or present), and both A and B is true (or present).

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, reversed, or otherwise controlled by another process.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

What is claimed is:

1. A multi-port, multi-mode valve comprising:
   a valve housing;
   at least a first port, a second port, a third port, a fourth port, and a fifth port on the valve housing; and
   a stemshell positioned at least partly inside the valve housing, the stemshell including a first channel and a second channel configured for selectively coupling either the first port or the second port to the third port while the fourth port remains continuously coupled to the fifth port, each of the first channel and the second channel having a first end and a second end, wherein the stemshell is a single and unitary actuated component of the multi-port, multi-mode valve and each side of the first channel and each side of the second channel are formed by the stemshell such that any fluid flow between coupled ports of the valve housing occurs internal to the stemshell via the first channel and the second channel.

2. The multi-port, multi-mode valve of claim 1, wherein a spacing between the first port and the second port is smaller than a spacing between the third port and the fourth port.

3. The multi-port, multi-mode valve of claim 1, wherein the first port, the second port, the third port, the fourth port and the fifth port are oriented within a common plane.

4. The multi-port, multi-mode valve of claim 1, wherein some of the ports are oriented within a common plane, and wherein at least the second port has a different orientation than the common plane.

5. The multi-port, multi-mode valve of claim 4, wherein the second port is aligned with an axis of rotation for the stemshell.

6. The multi-port, multi-mode valve of claim 1, wherein the stemshell is configured for rotating between positions that correspond to different couplings between the ports.

7. The multi-port, multi-mode valve of claim 1, wherein the stemshell is cylindrical.

8. The multi-port, multi-mode valve of claim 1, wherein the first channel has a first arcuate shape and the second channel has a second arcuate shape.

9. The multi-port, multi-mode valve of claim 8, wherein the first arcuate shape and the second arcuate shape face in opposite directions.

10. The multi-port, multi-mode valve of claim 8, wherein the stemshell is configured so that the first end of the first channel couples to either the first port or the second port, and so that the second end of the first channel couples to the fifth port, and wherein the first channel is configured so that the second end thereof couples to the fifth port both when the first end of the first channel couples to the first port and when the first end of the first channel couples to the second port.

11. The multi-port, multi-mode valve of claim 10, wherein the stemshell is configured so that the first end of the second channel couples to the third port, and wherein the second channel is configured so that the first end thereof couples to the third port both when the first end of the first channel couples to the first port and when the first end of the first channel couples to the second port.

12. The multi-port, multi-mode valve of claim 11, wherein the second channel is configured so that the second end thereof couples to the fourth port both when the first end of the first channel couples to the first port and when the first end of the first channel couples to the second port.

13. The multi-port, multi-mode valve of claim 1, wherein the first port corresponds to a component conduit and wherein the second port corresponds to a component bypass conduit.

14. The multi-port, multi-mode valve of claim 1, wherein a width of the first port at the stemshell is narrower than the widths of the third port and the fourth port at the stemshell.

15. The multi-port, multi-mode valve of claim 14, wherein a width of the second port at the stemshell is narrower than widths of the third port and the fourth port at the stemshell.

16. The multi-port, multi-mode valve of claim 1, wherein the stemshell is configured for selectively coupling either the first port or the second port to the third port while the fourth port remains continuously coupled to the fifth port during a parallel operation mode.

17. The multi-port, multi-mode valve of claim 1, wherein the stemshell is configured for selectively coupling either the first port or the second port to the third port while the fourth port remains continuously coupled to the fifth port during a serial operation mode.

18. A method performed with regard to a multi-port, multi-mode valve having at least a first port, a second port, a third port, a fourth port, and a fifth port, the method comprising:
orienting, in the multi-port, multi-mode valve, a stemshell thereof so that a first channel of the stemshell couples the first port to the third port, and so that a second channel of the stemshell couples the fourth port to the fifth port, each of the first channel and the second channel having a first end and a second end, wherein the stemshell does not couple the second port to any of the other ports;
receiving a signal corresponding to an instruction to instead couple the second port to the third port; and
in response to the signal, orienting the stemshell so that the first channel of the stemshell couples the second port to the third port, while the second channel of the stemshell continuously couples the fourth port to the fifth port, wherein the stemshell does not couple the first port to any of the other ports, and wherein the stemshell is a single and unitary component of the multi-port, multi-mode valve and each side of the first channel and each side of the second channel are formed by the stemshell such that any fluid flow between coupled ports of the multi-port, multi-port valve occurs internal to the stemshell via the first channel and the second channel.

* * * * *